United States Patent [19]

Naylor et al.

[11] Patent Number: 4,507,211

[45] Date of Patent: Mar. 26, 1985

[54] OIL RECOVERY METHOD UTILIZING AN ALKYLPHENYL ETHER PROPANE SULFONATE

[75] Inventors: Carter G. Naylor; David R. McCoy, both of Austin, Tex.

[73] Assignee: Texaco, Inc., White Plains, N.Y.

[21] Appl. No.: 423,414

[22] Filed: Sep. 24, 1982

[51] Int. Cl.³ .............................................. E21B 43/22
[52] U.S. Cl. ............................. 252/8.55 D; 166/275; 260/512 R
[58] Field of Search .............. 252/8.55 D; 260/512 R; 166/275

[56] References Cited

U.S. PATENT DOCUMENTS

| | | | |
|---|---|---|---|
| 3,977,471 | 8/1976 | Gale et al. | 252/8.55 X |
| 3,981,361 | 9/1976 | Healy | 252/8.55 X |
| 4,077,471 | 3/1978 | Shupe et al. | 252/8.55 X |
| 4,110,229 | 8/1978 | Carlin et al. | 252/8.55 |
| 4,318,816 | 3/1982 | Schievelbein | 252/8.55 |
| 4,340,492 | 7/1982 | Stournas | 252/8.55 |
| 4,442,042 | 4/1984 | Schmitt | 260/512 R |

*Primary Examiner*—Herbert B. Guynn
*Attorney, Agent, or Firm*—Robert A. Kulason; Jack H. Park; Richard A. Morgan

[57] ABSTRACT

Petroleum may be recovered from petroleum containing formations having high salinity and/or high temperature by injecting into the formation an aqueous fluid containing an effective amount of a surface active agent characterized by the formula:

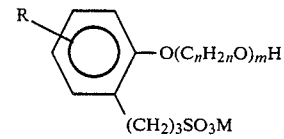

wherein R is an alkyl or dialkyl containing from 4 to 24 carbon atoms; n is an integer of from 2 to 4; m is an integer of from 1 to 50; and M is a cation.

18 Claims, No Drawings

OIL RECOVERY METHOD UTILIZING AN ALKYLPHENYL ETHER PROPANE SULFONATE

BACKGROUND OF THE INVENTION

1. Field of the Invention

This invention relates to a novel surfactant water flooding enhanced oil recovery process. The invention also relates to an alkylphenyl ether propane sulfonate composition of matter. The invention further relates to solutions containing an alkylphenyl ether propane sulfonate. The solutions are useful for recovering petroleum in an enhanced oil recovery process.

2. Prior Art

The crude oil which has accumulated in subterranean reservoirs is recovered or produced through one or more wells drilled into the reservoir. In the initial production, the crude oil is produced by primary recovery techniques wherein only the natural forces present in the reservoir are utilized to produce the oil. However, upon depletion of these natural forces and the termination of primary recovery a large portion of the crude oil remains trapped within the reservoir. Additionally, many reservoirs lack sufficient natural forces to be produced by primary methods from the very beginning. Recognition of these facts has led to the development and use of many enhanced oil recovery techniques. Most of these techniques involve injection of at least one fluid into the reservoir to produce an additional amount of crude oil therefrom. Some of the more common methods are water flooding, steam flooding, $CO_2$ flooding, polymer flooding, surfactant flooding, caustic flooding, and in situ combustion.

Water flooding, which involves injection of water into the subterranean oil reservoir for the purpose of displacing the crude oil from the pore spaces of the reservoir rock toward the producing wells, is the most economical and widely used of the enhanced oil recovery methods. Nevertheless, water does not displace oil with high efficiency because of the immiscibility of water and oil and because of the high interfacial tension between them.

Surfactant flooding involves the addition of one or more surface active agents or surfactants to the water flood for the purpose of minimizing the water flooding problems mentioned above. This has been an area of active interest in the art of enhanced oil recovery methods for many years. U.S. Pat. No. 3,302,713 discloses the use of petroleum sulfonates as effective surfactants in oil recovery operations. Other surfactants proposed for use in oil recovery processes include alkyl sulfates, alkyl aryl sulfates, ethoxylated alkyl or alkyl aryl sulfates, alkyl sulfonates, alkyl aryl sulfonates, and quaternary ammonium salts.

One major drawback of most of the above surfactants is the fact that they will precipitate where the water hardness, i.e. the concentration of divalent ions including calcium and magnesium, is relatively high. Since many formations contain very hard water, these surfactants are useless in some applications.

Another problem which frequently detracts from the performance of surfactants is that many degrade chemically and/or in performance at high formation temperatures. Petroleum sulfonates as well as other alkyl or alkylaryl sulfonates are relatively stable at room temperatures and at temperatures encountered in some subterranean petroleum reservoirs. However, these materials are usually not effective in the presence of high salinities and/or high formation water hardness. Conversely, nonionic surfactants such as polyethoxylated alkyl phenols are effective for surfactant flooding in formations containing high salinity water or hard water but these materials become insoluble at temperatures in the range of from about 100° F. to about 125° F. Therefore, if a reservoir is at this temperature, these materials are not effective.

One type of anionic surfactant which is frequently effective for use as a co-surfactant in combination with petroleum sulfonates or alkyl ro alkylaryl sulfonates is a water soluble sulfate salt of a polyethoxylated alcohol or alkyl phenol. However, the sulfate linkage is highly sensitive to temperature and hydrolysis or other permanent degradation of the sulfate linkage may take place at high temperatures. For example, the sulfate salt of a polyethoxylated alkyl phenol having an alkyl chain link of about nine carbon atoms and having approximately four or five ethylene oxide groups per molecule is degraded at about 140° F. This is not an unusually high temperature for certain reservoirs and since the surfactant will ordinarily be present in the formation for long periods of time, even years, the thermal stability of the surfactant solution becomes extremely important.

It is an object of this invention to provide surfactants which are tolerant of formation water salinity hardness and which are tolerant of temperatures in excess of 120° F. for long periods of time without hydrolyzing or becoming insoluble.

SUMMARY OF THE INVENTION

The present invention is an oil recovery process for use in subterranean, oil bearing formations whose temperatures are in excess of 120° F. and which may also contain highly saline and/or hard water, e.g. water containing appreciable quantities of sodium chloride and/or water soluble salts of divalent cations such as calcium or magnesium. The process comprises injecting an aqueous surfactant fluid into the subterranean formation and producing oil from production wells in the formation. The surfactants useful in the present invention are surface active agents having the general formula:

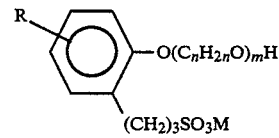

wherein R is an alkyl or dialkyl of from 4 to 25 carbon atoms, n is an integer of from 2 to 4, m is an integer of from 1 to 50 and M is a cation.

These surface active agents may be used as the only constituent in an aqueous solution or they may be used in combination with each other or with an anionic surfactant such as petroleum sulfonate.

DESCRIPTION OF THE PREFERRED EMBODIMENTS

This invention concerns an improved surfactant water flooding petroleum recovery process suitable for use in high salinity formations, e.g., formations containing water or brine whose salinity is from 20,000 to 240,000 parts per million total dissolved solids, which formation brines frequently also contain high concentration of divalent ions such as calcium and magnesium in the range from 1,000 to 20,000 parts per million. The surfactant fluid is ordinarily compounded to have about the same salinity present as the formation water, usually in the range from 50% to 100% and preferably from 75% to 100% of the salinity of the water present in the formation. In one embodiment, the present invention relates to a process for recovering petroleum from a subterranean petroleum bearing formation penetrated by an injection well and a production well which comprises:

(A) injecting into the formation via the injection well a drive fluid comprising water having dissolved therein an effective amount of a surface active agent having the general formula:

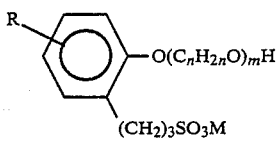

wherein R is an alkyl or dialkyl of from 4 to 25 carbon atoms, preferably 8 to 15 carbon atoms, n is an integer of from 2 to 4 preferably 2, m is an integer of from 1 to 50 preferably 2 to 10 and M is a cation; and (B) forcing the fluid through the formation; and
(C) recovering petroleum through the production well.

In one embodiment, M is a cation selected from the group consisting of sodium, potassium, calcium and ammonium.

As previously mentioned, the fluid is typically made up in brine solution and particular compatibility with brine has been found when M is sodium.

The concentration of an effective amount of alkylphenyl ether propane sulfonate in aqueous solution will vary depending on the particular homologue chosen for use as well as the water salinity and hardness and the temperature to be encountered in the formation. It is preferred that the optimum response at various concentrations be measured under conditions simulating those which will be present in the formation and the concentration which corresponds to the optimum surfactant performance characteristics be identified in this manner. In actual field use, the concentration of surfactant used will be considerably greater than the optimum value determined from the capillary displacement value in order to compensate for surfactant absorbed by the formation. Generally the concentration of alkylphenyl ether propane sulfonate will be from about 0.05 to about 5.0 percent and preferably from about 0.1 to about 2.0 percent by weight.

The volume of surfactant solution to be utilized in the process of the present invention can vary from about 2 to 75 pore volume percent and is preferably from about 10 to about 50 pore volume percent. It is, of course desirable from an economic standpoint to use as small an amount of surfactant as possible to attain the necessary performance.

Ordinarily, the petroleum formation will have been subjected to conventional water flooding before the application of the surfactant solution of this invention; although this is not a requirement for the application of the surfactant process of the invention. Water flooding is generally undertaken if it will result in the recovery of a reasonable quantity of oil above that required by primary means since it is much less costly than surfactant flooding or other means of enhanced recovery. If the surfactant flooding process is to be applied to a formation which has already been water flooded, the water sample tested should be that for water existing in the formation after water flooding since the concentration of salt as well as water soluble salts of diavalent cations such as calcium or magnesium may be changed as a consequence of injecting water differing from the original formation water. As a corollary to this, the formation temperature after water flooding should be ascertained since it may have been altered as a consequence of the water flooding process. Preflushing with a sacrificial agent, e.g., inorganic phosphate, may be useful to minimize adsorption losses of the surfactant on the formation matrix.

It is also common practice to follow the surfactant solution with an aqueous solution which contains little or no surfactant but which has dissolved in it a substance which increases viscosity of the water so as to attain a favorable mobility ratio between that solution and the previously injected surfactant solution. Hydrophilic polymers such as sodium polyacrylamide or polysaccharides are commonly utilized for this purpose. The type and quantity of viscosity increasing polymer injected subsequent to the surfactant solution can generally be the same as is regularly used for such purposes in conventional surfactant flooding. Generally from about 5 to about 50 pore volume percent of an aqueous solution containing from about 100 to about 800 parts per million of the hydrophilic polymer is used. This is followed by water injection which is continued until the water-oil ratio of the fluid being recovered from the formation increases to a point where further injection of water is uneconomical. It is, of course, also acceptable to increase the viscosity of the surfactant fluid by incorporation of a similar polymer.

Another embodiment of the present invention is an aqueous solution comprising:

(A) about 0.1 wt % to about 2 wt % of a surface active agent of the formula:

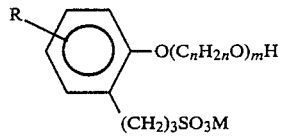

wherein R is an alkyl or dialkyl containing from 4 to 25 carbon atoms, preferably 8 to 15 carbon atoms, n is an integer of from 2 to 4, preferably 2, m is a integer of from 1 to 50, preferably 2 to 10 and M is a cation; and (B) about 0.1 wt % to about 4 wt % of a petroleum sulfonate.

It is preferred that the petroleum sulfonate be at least partially water soluble with an average equivalent weight at a range of from about 350 to 450. The ratio of the alkylphenyl ether propane sulfonate to petroleum sulfonate should be from 0.05:1.0 to 1:1 and preferably from 0.1:1.0 to 1.0:1.0.

The water which makes up the aqueous medium of the fluid mixture of this invention may be either hard or soft. The invention has been found to be particularly useful in hard water such as brine which contains considerable amounts of divalent ions. That is, the invention is especially effective for stabilizing aqueous surfactant solutions in which the aqueous medium contains considerable amounts of calcium and/or magnesium ions and is considered hard water. It is in these hard waters that some surfactants are particularly prone to be unstable. It is known in the art that surfactants such as petroleum sulfonates are not at all compatible with calcium and magnesium ions in hard water. Recent discoveries have shown that the sulfonates of alkylene oxide adducts of substituted phenols are compatible with calcium and magnesium ions in hard water or brine but their stability, that is their ability to remain in solution under all conditions of temperature and water hardness and salinity, is at times a problem.

The present invention while including all types of water is particularly directed to hard water brines. Hard water may be defined as an aqueous solution containing from 100-20,000 parts per million polyvalent metal ions such as calcium and/or magnesium ions. Brines contain a minor amount to 25% by weight sodium chloride and many contain various amounts of other dissolved salts such as sodium bicarbonate, sodium sulfate, and sodium borate. The invention is operable in hard water, brines or hard water brines.

The water may also contain dissolved nitrogen, hydrogen sulfide, carbon dioxide, methane or other gases.

The various materials available under the general name of petroleum sulfonates vary in composition according to the petroleum fraction used for sulfonation and in the degree of sulfonation imparted to the petroleum fraction. Preferable petroleum sulfonates are those prepared from a petroleum fraction whose boiling range is from 700° F. to 1100° F. which corresponds to a molecular weight range of from about 350 to about 500. The sodium salt of the sulfonated product of this petroleum fraction is an excellent material for use in the present invention. The potassium and ammonium salts are also useful.

Mixtures of petroleum sulfonates can also be employed in the solution of the present invention. For example, a mixture of predominantly water soluble petroleum sulfonate having an average equivalent weight of less than 400 and preferably less than 350 may be utilized along with a second petroleum sulfonate which is at least partially oil soluble and having an average equivalent weight of about 400 to about 600 and preferably about 450 to about 550.

It has been found that the degrees of solubility of the surfactant composition in the field water is extremely critical to the oil recovery efficiency in the process. If the surfactant is much more soluble in water than oil, then the surfactant tends to be distributed throughout the bulk of the water phase including both formation water and injected drive water, and little effectiveness will be achieved at the interfacial zones between oil and water. Similarly, if the surfactant is substantially more soluble in oil than it is in water, the surfactant will partition into and distribute itself throughout the oil phase, and will have little effect on the surface tension existing at the interfacial zone between oil and water. The optimum surfactant effectiveness is achieved if there is a condition of borderline solubility of the surfactant fluid in the drive motor and/or formation water, so that the surfactants tend to exist in higher concentrations at the interfacial zone between oil and water than in either the oil phase or the water phase.

It has been found that when using blends of petroleum sulfonates and the alkylphenyl ether propane sulfonate of the present invention, optimum oil recovery efficiency occurs when the concentrations of the materials were carefully balanced so as to produce a condition of borderline solubility. If too little solubilizing cosurfactant is used, the primary surfactants are rendered insoluble and at least a portion thereof will precipitate in the aqueous solution. This can, as discussed above, result in at least reducing the effectiveness of the surfactant fluid for the purpose of recovering oil, and may lead to permanent, irreversible damage to permeability of the formation matrix, which will prevent any further displacement of petroleum from the formation. On the other hand, if more than the minimum amount of solubilizing alkylphenyl ether propane sulfonate which achieves the conditions which we have described above as borderline solubility is used in combination with petroleum sulfonate, the surfactants are rendered too soluble in the aqueous phase and the amount of oil displaced by such a solution being injected into a formation is reduced fairly substantially. Moreover, since the cost of the alkylphenyl ether propane sulfonate is high compared to that of petroleum sulfonate, the result of using too much solubilizing alkylphenyl ether propane sulfonate is that the fluid cost is increased and the amount of oil recovered by the use of the fluid is decreased, with rapidly diminishing economic attractiveness of the process.

The amount of solubilizing alkylphenyl ether propane sulfonate to achieve the above described desired condition of borderline solubility is highly dependent on all of the possible variations in the structural characteristics of the surfactant molecules employed. the average equivalent weight of the petroleum sulfonate for example, will affect the amount of alkylphenyl ether propane sulfonate required to achieve the condition of borderline solubility. For example, any change in the length of the alkyl chain which comprises the hydrophobe of the surfactant molecule, or a change in the number of alkylene oxide groups condensed with the molecule, will change the amount of alkylphenyl ether propane sulfate cosurfactant needed to achieve the condition of borderline solubility with whatever primary anionic surfactant or mixture thereof it is used. Furthermore, the aqueous fluid salinity and the concentration of divalent ions present in the fluid will also determine the amount of the surfactant needed to achieve borderline solubility. Generally, higher salinity and/or higher concentrations of divalent ions of the aqueous fluid in which the surfactants are dissolved require increasing number of alkylene oxide units to be present on the solubilizing cosurfactant molecule.

It has been found that one satisfactory method for determining the proper concentrations of petroleum sulfonate and alkylphenyl ether propane sulfonate is found in U.S. Pat. No. 4,066,124 which is incorporated herein in its entirety by reference. By this method it has been found that brine solutions of about 0.1 wt. % to about 2 wt. % of the alkylphenyl ether propane sulfonate of the present invention and about 0.1 wt. % to about 4 wt. % of a petroleum sulfonate herein defined produce advantageous results in an enhanced oil recovery process. These advantageous results include applications where hydrolytically and thermally stable surface active agents soluble in salt solutions containing divalent cations is required. Advantageous results are also achieved where relatively viscous solutions or emulsions are desired.

One unexpected advantage of the alkylphenyl ether propane sulfonate of the present invention is the surprising stability and viscosity displayed by some of the compounds over a wide range of salinities and temperatures.

In another embodiment, the present invention relates to a composition of matter characterized by the formula:

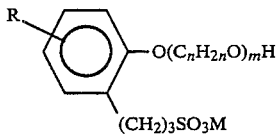

wherein R is an alkyl or dialkyl containing from 4 to 25 carbon atoms, preferably 8 to 15 carbon atoms; n is an integer of from 2 to 4 preferably 2; m is an integer of from 1 to 50 and preferably 2 to 10 and M is a cation.

M is a cation preferably selected from the group consisting of sodium, potassium, calcium and ammonium. Sodium is a preferred cation.

Compounds of the present invention are prepared in a unique sequence.

(1) Preparation of Allyl Ether - Allylation

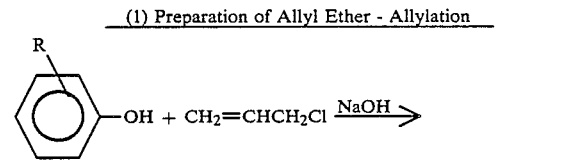

(2) Claisen Rearrangement

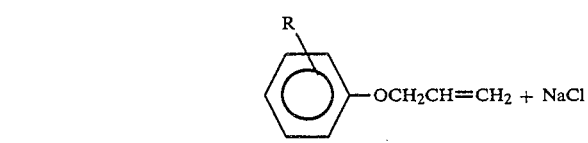

(3) Alkoxylation

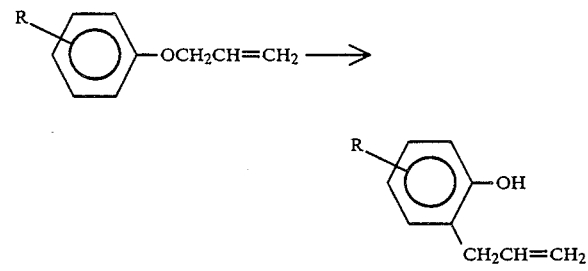

(4) Bisulfite Addition

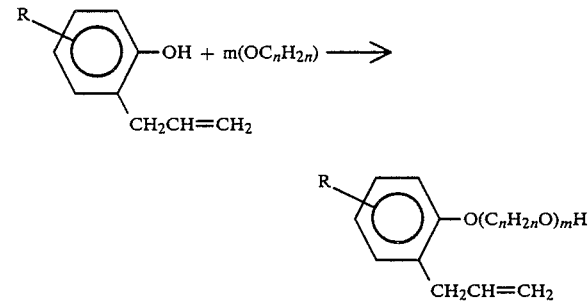

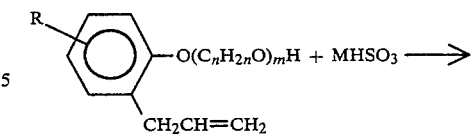

The composition of matter of the present invention encompasses a new series of anionic surfactants. The three carbon bridge separating the phenyl ring from the sulfonate group has been found to have advantages over similar compounds containing fewer than three carbon atoms in the bridge.

The 2-(hydroxy phenyl)-ethane sulfonic acid derivatives of formula:

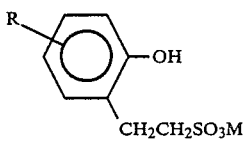

have a two carbon bridge. These compounds have not been reported in the literature.

The compound (hydroxyphenyl)methanesulfonate of formula:

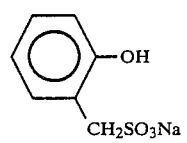

is cited in *Industrial and Engineering Chemistry* 43, 2028 (1951). This compound is synthesized by sulfomethylation of phenol with formaldehyde and sodium bisulfite, but alkylphenol sulfomethylation is difficult and inefficient because it involves heterogeneous reaction conditions. The sulfomethyl alkylphenols which result would be difficult to alkyoxylate because they are insoluble in organic solvents. Alkoxylation could be accomplished by making a suspension of dry sulfomethylalkylphenol in an inert medium or an aqueous solution. Either method would give poor addition of alkylene oxide.

Ring sulfonation of alkylphenols is shown in U.S. Pat. No. 3,766,254, but alkoxylation of the alkylphenol sulfonates would have the same problems noted in sulfomethylalkylphenols as stated in U.S. Pat. No. 4,104,023.

In the composition of matter of the present invention, any degree of an alkoxylation can be achieved, because alkylene oxide is added under homogeneous conditions before sulfonation with almost quantitative yields. The allylation, Claisen rearrangement and sulfonation steps use methods known in the art. U.S. Pat. No. 4,060,563 describes allylation and rearrangements of unsubstituted phenol. *Industrial of Engineering Chemistry* 43, 2028 (1951) describes sulfonation of alkylphenol.

This invention is more fully illustrated by the following Examples.

EXAMPLE I

Step (a) Preparation of Allylnonylphenyl Ether

Commercially available nonylphenol was mixed with 300 g isopropyl alcohol and 60 g of 50% NaOH to give a homogeneous solution. Allyl chloride (80 ml = 1.2 equiv.) was added dropwise at 40° C. over 20 minutes. The mixture was digested five hours at 75° C. Water, 150 g, was added to dissolve the precipitated salt. The resulting mixture separated into two phases. The top layer was stripped of solvent to give 197 g crude product of hydroxyl value 0.19 meq/g. Conversion was calculated to be 95%.

Step (b) Claisen Rearrangement of Allylnonylphenyl Ether

The crude product from step (a) was distilled under vacuum to separate the ether from impurities (150°–160° C. at 2–3 torr). The distillate was heated at 200° C. for 6 hours, then distilled. The colorless viscous product had a hydroxyl value of 3.78 meq/g (Calc. 3.85); HPLC (high pressure liquid chromatography) showed the product to contain 91.5 area % allylnonylphenol, 4.4%, allylnonylphenyl ether and other minor components, 3.5% unknown and 0.6% nonylphenol.

Step (c) Ethoxylation of Allylnonylphenol

Allylnonylphenol from step (b) 350 g was mixed with 10 g of 50% KOH and stripped under vacuum and nitrogen purge for one hour at 100° C. Ethylene oxide was added at 120°–30° C. Samples were withdrawn after 4, 6 and 8 moles had been added. These samples were the 4, 6 and 8 molar ethoxylates of allylnonylphenol.

Step (d) Preparation of Ethoxylated 3-(2-hydroxy-5-nonylphenyl) Propane Sulfonic Acid, Sodium Salt The 8-mole ethoxylate of allylnonylphenol from step (C), 126 meq, was dissolved in aqueous isopropyl alcohol, buffered to pH 7.2 with sodium bisulfite and sodium sulfite. Sodium bisulfite solution was added at 55° C. with air purging at a rate sufficient to maintain pH. After 13 hours, 122 meq bisulfite had been added, including that needed for the buffer. The reaction mixture separated into two phases. The top layer contained 0.094 meq/g anionic active by Hyamine titration (6.6 wt. %, 33% yield). The top layer was extracted four times with ethyl acetate to remove unreacted nonionics. The resulting aqueous solution was 10.2% active. HPLC analysis revealed 71 area % ionic and 28 area % nonionic components. U.S. Patent Application Ser. No. 638,586 filed Dec. 8, 1975 now abandoned teaches what products result from bisulfite addition to olefinic double bonds. Sulfonate and sulfinate-sulfonate are both present, the ratio depending on the pH during addition. The nonionics remaining in the product are primarily the intermediate allylnonylphenol ethoxylates.

The product of this step was 3-(2-octaethoxy-5-nonylphenyl) propane sulfonic acid, sodium salt and was designated Product IV.

The 6-mole ether sulfonate, sodium salt was made by the same procedure and designated Product V. The product was 4.9% active, and HPLC showed 43 area % ionic and 57% nonionic components.

The 4-mole ether sulfonate, sodium salt was made by the same procedure and designated Product VI. The product was 3.1% active, HPLC analysis showed 61 area % ionics and 38 area % nonionics.

Step (e) Contrasting Synthesis

Unethoxylated allylnonylphenol step (b) product was treated with bisulfite by the procedure of step (d). No consumption of bisulfite occurred in 8 hours.

This result demonstrates that the phenolic hydroxyl must be etherified for sulfonation of the allyl group to be possible. The phenol acts as a free radical scavenger, inhibiting the radical-initiated bisulfite addition.

EXAMPLE II

The products of Example I were tested for surface tension and interfacial tension. The results found are as follows:

| Product | Surface Tension, 0.1% Active | Interfacial Tension, 0.1% |
|---------|------------------------------|---------------------------|
| IV      | 38.5 dynes/cm                | 8.3 dynes/cm              |
| V       | 32.6                         | 5.8                       |
| VI      | 30.6                         | 5.8                       |

EXAMPLE III

The products of Example I were dissolved in a synthetic brine (9.2 wt. %, NaCl, 2.4 wt. % $CaCl_2$, 2.0 wt. % $MgSO_4 \cdot 6H_2O$) which simulates an oil field brine. All these 1% solutions were between 25° C. and 100° C.

The 1% Product IV brine solution was mixed with 1% petroleum sulfonate. The petroleum sulfonate used was a 30:70 blend TRS-18 (equivalent weight 502) and TRS-40 (equivalent weight 337). TRS-18 is a water soluble petroleum sulfonate and TRS-40 is oil soluble. Both are manufactured by Witco Chemical Co. The solution was clear up to 80° C., at which point it clouded. The solution clarified upon cooling below 80° C.

EXAMPLE IV

The ether sulfonate products of Exmaple I were dissolved in the simulated oil field brine of Example III along with alkylbenzene sulfonates. The ability of the ether sulfonates to solubilize the alkylbenzene sulfonates was determined by measuring the solution cloud point. Ether sulfonate concentration was held at 1.0%. Table I summarizes the results obtained.

TABLE I

| Solubilizer @ 1% | Wt. % $C_{12}LAS^1$ | Cloud point, °C. | Wt. % $C_{13}LAS^2$ | Cloud point, °C. |
|------------------|---------------------|------------------|---------------------|------------------|
| Product IV       | 0.5                 | 100              | 0.5                 | 98               |
|                  | 0.6                 | 92               | 0.6                 | 89               |
|                  | 0.7                 | 74               | 0.7                 | 74               |
|                  | 0.8                 | 44               | 0.8                 | —                |
|                  |                     |                  | 0.9                 | 51               |
|                  |                     |                  | 1.0                 | 18               |
| Product V        | 0.4                 | 93               | 0.4                 | 84               |
|                  | 0.5                 | 65               | 0.5                 | 62               |
|                  | 0.6                 | 35               | 0.6                 | 22               |
|                  | 0.7                 | 0                | 0.7                 | 3                |
| Product VI       | 0.2                 | 94               |                     |                  |
|                  | 0.3                 | 33               |                     |                  |

[1]Dodecylbenzene sulfonate (WITCONATE ® 1238)
[2]Tridecylbenzene sulfonate (SULFRAMIN ® 1345)

Cloud points declined as alkylbenzene sulfonate concentration increased. The three ether sulfonates displayed improving solubilizing properties as ethoxylate level increased from 4 to 6 to 8 moles of ethylene oxide.

Dodecylbenzene sulfonate was slightly better solubilized than tridecylbenzene sulfonate.

EXAMPLE V

In a field in which the primary production has already been exhausted, an injection well is completed in the hydrocarbon-bearing formation and perforations are formed between the interval of 6890–6910 feet. A production well is drilled approximately 415 feet distance from the injection well, and perforations are similarly made in the same hydrocarbon-bearing formation at 6895–6915 feet.

The hydrocarbon-bearing formation in both the injection well and the production well is hydraulically fractured using conventional techniques, and a gravel-sand mixture is injected into the fracture to hold it open and prevent healing of the fracture.

In the next step oil field brine of 1000 ppm hardness at a temperature of 75° F. containing dissolved therein 1% by weight petroleum sulfonate and 0.5% by weight of Product IV of Example I, is injected via the injection well into the formation at a pressure of about 1300 psig and at the rate of 1.05 barrels per minute. Injection of the drive fluid continues at the rate of 1.05 barrels per minute and at the end of 87 days a substantial production of petroleum is achieved.

The principle of the invention and the best mode contemplated for applying that principle have been described. It is to be understood that the foregoing is illustrative only and that other means and techinques can be employed without departing from the true scope of the invention defined in the following claims.

We claim:

1. A process for recovering petroleum from a subterranean petroleum bearing formation penetrated by an injection well and a production well which comprises:
   (a) injecting into the formation via the injection well a drive fluid comprising water having dissolved therein about 0.05 to 5.0 wt. % of a surface active agent having the general formula:

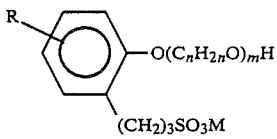

wherein r is an alkyl or dialkyl of from 4 to 25 carbon atoms, n is an integer of from 2 to 4, m is an integer of from 1 to 50; and M is a cation;
   (b) forcing the fluid through the formation; and
   (c) recovering petroleum through the production well.

2. The process of claim 1 wherein R contains from 8 to 15 carbon atoms.

3. The process of claim 1 wherein n is the integer 2.

4. The process of claim 1 wherein m is an integer of from 2 to 10.

5. The process of claim 1 wherein n is the integer 2 and m is an integer of from 2 to 10.

6. The process of claim 1 wherein M is a cation selected from the group consisting of sodium, potassium, calcium and ammonium.

7. The process of claim 1 wherein M is sodium.

8. The aqueous solution comprising:
   (a) about 0.1 wt. % to about 2 wt. % of a surface active agent of the formula:

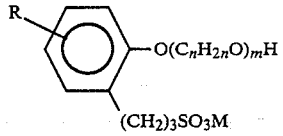

wherein R is an alkyl or dialkyl containing from 4 to 25 carbon atoms; n is an integer of from 2 to 4; m is an integer of from 1 to 50; and M is a cation; and
   (b) about 0.1 wt. % to about 4 wt. % of a petroleum sulfonate.

9. The solution of claim 8 wherein R contains from 8 to 15 carbon atoms.

10. The solution of claim 8 wherein n is the integer 2.

11. The solution of claim 8 wherein m is an integer of from 2 to 10.

12. The solution of claim 8 wherein n is the integer 2 and m is an integer of from 2 to 10.

13. The solution of claim 8 wherein M is a cation selected from the group consisting of sodium, potassium, calcium and ammonium.

14. The solution of claim 8 wherein M is sodium.

15. The solution of claim 8 wherein the petroleum sulfonate has a molecular weight of about 350 to about 500.

16. The aqueous solution comprising:
   (a) about 0.1 wt. % to about 2 wt. % of a surface active agent of the formula:

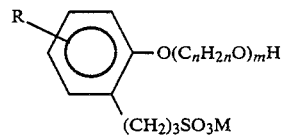

wherein R is an alkyl or dialkyl containing from 4 to 25 carbon atoms; n is an integer of from 2 to 4; m is an integer of from 1 to 50; and M is a cation; and
   (b) about 0.1 wt. % to about 4 wt. % of an alkylbenzene sulfonate.

17. The solution of claim 16 wherein the alkylbenzene sulfonate is dodecylbenzene sulfonate.

18. The solution of claim 16 wherein the alkylbenzene sulfonate is tridecylbenzene sulfonate.

* * * * *